(12) United States Patent
Pelosse

(10) Patent No.: US 8,256,851 B2
(45) Date of Patent: Sep. 4, 2012

(54) DECELERATION CONTROL FOR A VEHICLE

(75) Inventor: Jean Francois Pelosse, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 1090 days.

(21) Appl. No.: 12/170,793

(22) Filed: Jul. 10, 2008

(65) Prior Publication Data
US 2010/0007200 A1 Jan. 14, 2010

(51) Int. Cl.
*B60T 8/74* (2006.01)
(52) U.S. Cl. .......................... 303/177; 303/123
(58) Field of Classification Search .......... 303/3, 7, 303/123, 138, 177
See application file for complete search history.

(56) References Cited

U.S. PATENT DOCUMENTS

| 3,806,202 | A | 4/1974 | Ochiai |
| 5,014,202 | A * | 5/1991 | Thatcher ......................... 701/85 |
| 5,748,477 | A | 5/1998 | Katoh |
| 5,752,214 | A | 5/1998 | Minowa et al. |
| 5,902,345 | A | 5/1999 | Minowa et al. |
| 6,216,082 | B1 | 4/2001 | Minowa et al. |
| 6,397,140 | B2 | 5/2002 | Minowa et al. |
| 6,668,225 | B2 * | 12/2003 | Oh et al. ......................... 701/70 |
| 6,692,089 | B2 * | 2/2004 | Kuwajima et al. ............ 303/163 |
| 7,184,889 | B2 | 2/2007 | Isaji et al. |
| 7,322,660 | B2 | 1/2008 | Batistic et al. |
| 7,681,960 | B2 * | 3/2010 | Wanke et al. ................. 303/146 |
| 7,731,302 | B2 * | 6/2010 | Tandy et al. ....................... 303/7 |
| 7,798,263 | B2 * | 9/2010 | Tandy et al. ................. 180/14.6 |
| 7,809,486 | B2 * | 10/2010 | Haller et al. ..................... 701/70 |
| 2001/0008989 | A1 | 7/2001 | Minowa et al. |
| 2004/0262994 | A1 * | 12/2004 | Baumann et al. ............. 303/155 |
| 2005/0218718 | A1 | 10/2005 | Iwatsuki et al. |
| 2006/0163943 | A1 | 7/2006 | Von Holt et al. |
| 2007/0061061 | A1 | 3/2007 | Salman et al. |
| 2007/0142996 | A1 | 6/2007 | Lee |
| 2007/0150159 | A1 | 6/2007 | Linden |
| 2007/0208485 | A1 | 9/2007 | Yamamura et al. |
| 2007/0232448 | A1 | 10/2007 | Linden |
| 2008/0172163 | A1 * | 7/2008 | Englert et al. ................... 701/83 |
| 2010/0156667 | A1 * | 6/2010 | Bennie et al. ................. 340/902 |

* cited by examiner

*Primary Examiner* — Bradley King
(74) *Attorney, Agent, or Firm* — Michael Best & Friedrich LLP

(57) ABSTRACT

A method, a vehicle using the method, and a system using the method, of controlling the vehicle configured to tow a trailer. The method includes determining first and second vehicle parameters indicative of first and second conditions of the vehicle, and determining a trailer presence from at least one of the first and second vehicle parameters. The method also includes updating the first vehicle parameter when the trailer is present, generating a third vehicle parameter, and determining first and second braking control parameters from the first, second, and third vehicle parameters. The first braking control parameter corresponds to at least one of the second and third vehicle parameters, and the second braking control parameter correspond to at least one of the first and second vehicle parameters. The method can further include generating a braking signal based on one of the first and second braking control parameters.

24 Claims, 4 Drawing Sheets

DECELERATION CONTROL FOR A VEHICLE

BACKGROUND

Embodiments of the invention relate to methods of and systems for controlling a motor vehicle, particularly when it tows a trailer or semi-trailer.

Stability is a primary concern for a vehicle attempting to brake, especially when the vehicle tows a trailer. In addition, road conditions also affect how a vehicle comes to a stop. For example, when a vehicle is traveling at normal speed on a dry road, the vehicle activates its brakes and comes to a stop after a period of time has elapsed. However, when a vehicle is traveling at the same speed on an icy road, the vehicle takes longer to come to a stop. When a vehicle is towing a trailer, for example, the stability of the vehicle also becomes a major concern, particularly when the vehicle travels at high speed, makes a turn, and/or travels under non-ideal road conditions.

While many vehicles are usually equipped with anti-lock braking systems ("ABS"), or electronic stability programs ("ESP"), trailers are generally not equipped with ABS, or ESP. As such, feedback from a trailer to a towing vehicle is unavailable. Excessive braking by a motor vehicle towing a trailer may result in swinging of the trailer, which causes instability of the vehicle and/or the trailer. As a result, there is a limited amount of deceleration (braking) that a towing vehicle can exert while maintaining stability of the towing vehicle.

SUMMARY

The invention provides, in at least one embodiment, a system that dynamically assesses real-time vehicle dynamics, as well as other available and relevant information that describe actual external and road conditions, to exert an appropriate amount of deceleration above an otherwise predetermined braking limit while maintaining stability of a vehicle. Once the information has been analyzed, a plurality of deceleration (braking) values are generated. The vehicle decelerates based on a minimum of the deceleration values.

In another embodiment, the invention provides a method of controlling a vehicle configured to tow a trailer. The method includes determining first and second vehicle parameters indicative of first and second conditions of the vehicle, and determining a trailer presence from at least one of the first and second vehicle parameters. The method also includes updating the first vehicle parameter when the trailer is present, generating a third vehicle parameter, and determining first and second braking control parameters from the first, second, and third vehicle parameters. The first braking control parameter corresponds to at least one of the second and third vehicle parameters, and the second braking control parameter corresponds to at least one of the first and second vehicle parameters. The method also includes generating a braking signal based on one of the first and second braking control parameters.

In another embodiment, the invention provides a method of controlling a vehicle operable to tow a trailer. The method includes determining first and second vehicle parameters indicative of first and second conditions of the vehicle, and determining first and second correlations based on the first and second vehicle parameters. The method also includes determining first and second braking control parameters based on the first and second correlations. The first braking control parameter corresponds to the first correlation, and the second braking control parameter corresponds to the first and second correlations. The method also includes determining from one of the first and second braking control parameters an achievable braking control parameter for the vehicle.

In yet another embodiment, the invention provides a system for controlling a tow vehicle. The system includes first and second sensors, a correlator, an acceleration limiter, a jerk limiter, and a selector. The first and second sensors sense respective first and second vehicle parameters indicative of one or more conditions of the vehicle (e.g., speed, distance (such as a distance between the towing vehicle and another vehicle in front of the towing vehicle), and road condition (such as a coefficient of friction experienced by tires)). The correlator determines a plurality of correlations based on at least one of the first and second vehicle parameters. The acceleration limiter determines a plurality of acceleration values based on the first and second vehicle parameters and the correlations. The jerk limiter determines a plurality of jerk values based on the first and second vehicle parameters and the correlations. The selector determines an achievable value for each of the plurality of applicable acceleration values and jerk values for the vehicle.

In still another embodiment, the invention provides a vehicle that includes first and second sensors, a correlator, a hitch, a processor, an acceleration limiter, a jerk limiter, a selector, and a brake system. The first and second sensors sense respective first and second vehicle parameters indicative of one or more conditions of the vehicle (such as those mentioned above). The hitch is configured to receive a trailer. The processor determines if a trailer is present based on information from at least one of the first and second sensors, and updates the first vehicle parameter when a trailer is present. The correlator determines a plurality of correlations based on at least one of the first and second vehicle parameters. The acceleration limiter determines a plurality of acceleration values based on the first and second vehicle parameters and the correlations. The jerk limiter determines a plurality of jerk values based on the first and second vehicle parameters and the correlations. The selector determines an achievable value for each of the plurality of applicable acceleration values and jerk values for the vehicle. The brake system is activated to decelerate the vehicle based on the achievable value.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. In addition, capitalized terms are used throughout the specification. Such terms are used to conform to common practices and to help correlate the description with the coding examples and drawings. However, no specific meaning is implied or should be inferred simply due to the use of capitalization.

Embodiments of the invention relate to methods of and systems for controlling a motor vehicle when it tows a trailer or semi-trailer. In one embodiment, a plurality of values describing a plurality of towing vehicle dynamics and road conditions are determined. The towing vehicle is controlled based on the values determined.

In a specific embodiment, when a vehicle is traveling on a road, an external value that indicates a condition of the road is sensed. A plurality of other vehicle conditions that indicate a plurality of movements of the vehicle are also sensed. A relationship between the external value and at least one of the vehicle conditions is determined. Based on the relationship, a control parameter for the vehicle is generated.

Figure 1:
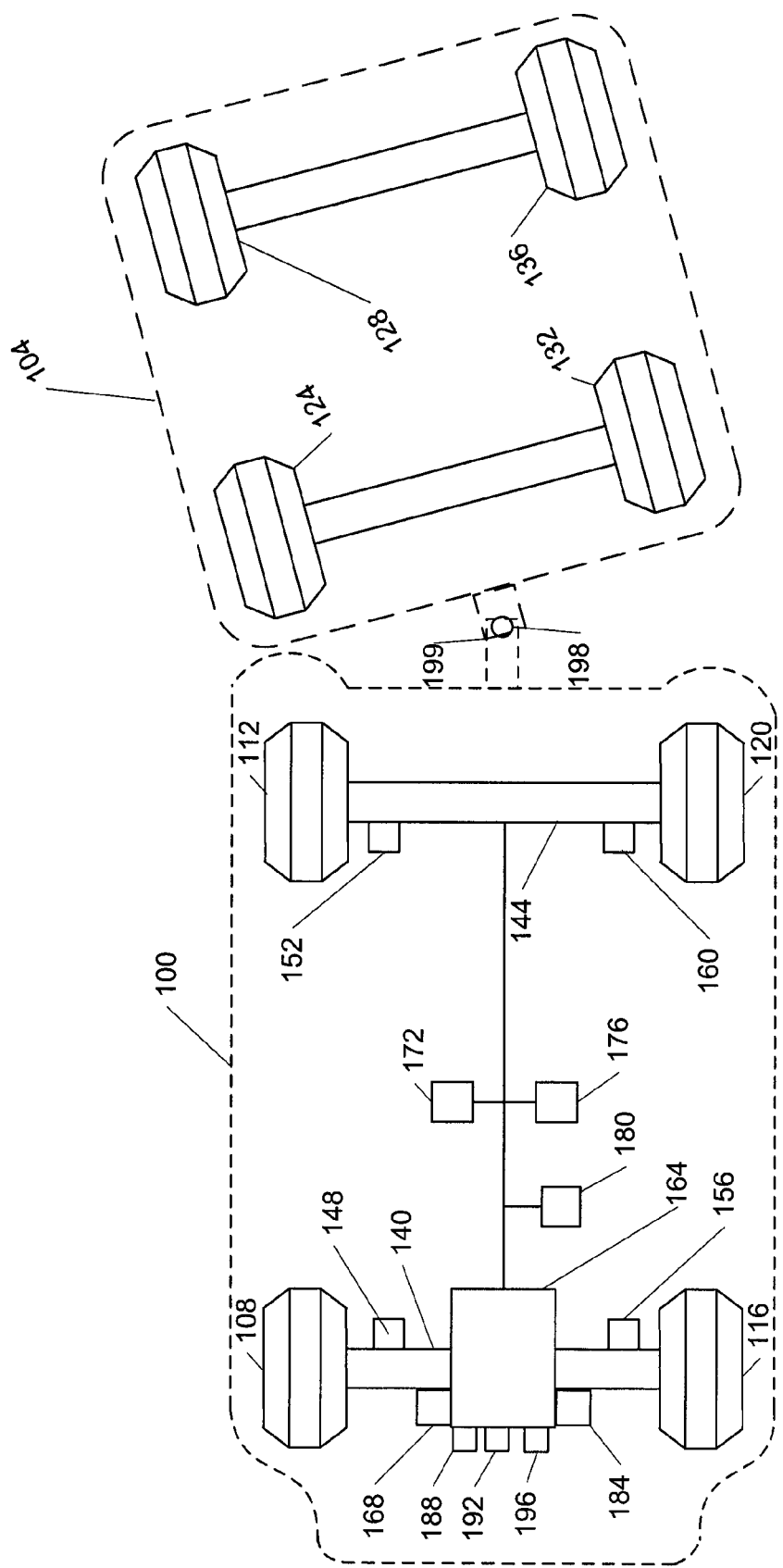
FIG. 1 is a schematic plan view of a vehicle configured to tow a trailer.

FIG. 1 illustrates (schematically) a towing vehicle 100 towing a trailer 104. The towing vehicle 100 has four wheels 108, 112, 116, and 120. The trailer 104 also has four wheels 124, 128, 132, and 136. In some other embodiments, the vehicle 100 and the trailer 104 has more or less wheels, respectively. The trailer 104 can be a semi-trailer, a full-size trailer, a boat trailer, a camper, or the like. The wheels 108, 112, 116, and 120 are connected to two axles 140 and 144. The four wheels 108, 112, 116, and 120 are monitored by a plurality of wheel speed sensors 148, 152, 156, and 160, respectively. The wheel speed sensors 148, 152, 156, and 160 are coupled to an electronic processing unit ("ECU") 164. In some embodiments, the ECU 164 includes multiple ECU's, such as an ECU array that controls different operations and functions of the vehicle 100. In one implementation the ECU 164 includes a hitch detection ECU that detects the presence of a trailer.

The vehicle 100 includes a steering angle sensor 168, a yaw rate sensor 172, and a lateral acceleration sensor 176. The wheel speed sensors 148, 152, 156, and 160, the steering sensor 168, the yaw rate sensor 172, and the lateral acceleration sensor 176 are shown as individual sensors. However, these sensors (148, 152, 156, 160, 168, 172, and 176) can also include multiple sensors in a plurality of sensor arrays, for example, that may be coupled to the ECU 164. Other sensor types, such as a body slip angle sensor 180, an engine torque sensor 184, a forward-looking radar sensor 188, a temperature sensor 192, and a wiper activity sensor 196 can also be used in the vehicle 100. In some embodiments, the wiper activity sensor 196 generates a frequency at which a wiper is operating. In other embodiments, the wiper activity sensor 196 generates a signal indicative of a rate of water (e.g., rain) falling on the windshield of the vehicle 100. The vehicle 100 also includes an optional hitch sensor 198 at a hitch 199 that is coupled to the trailer 104. In some embodiments, the optional hitch sensor 198 allows the vehicle 100 to weigh or sense a load attached to the vehicle 100 at the hitch 199. In other embodiments, the optional hitch sensor 198 allows the vehicle 100 to detect the presence of a load. In still other embodiments, the vehicle 100 determines the presence and the weight of a load from other existing sensors, such as, the sensors 148, 152, 156, 160, 168, 172, 176, 180, 184, 188, 192, 196, and 198.

The ECU 164 determines dynamic conditions, external conditions, and road surfaces experienced by the vehicle 100 based at least in part on signals generated by the sensors 148, 152, 156, 160, 168, 172, 176, 180, 184, 188, 192, 196, and 198. In some embodiments, the vehicle dynamic conditions are expressed by values such as yaw rates, longitudinal velocities, lateral velocities, stability event history, total load of the towing vehicle, and the like. Road conditions are, in some embodiments, expressed by values such as a distance between the vehicle 100 and adjacent objects, wiper activity in the case of rain and snow, and temperature. Exemplary road surfaces include, but are not limited to, ice, snow, deep snow, wet asphalt, dry asphalt, wet paved road, dry paved road, gravel road, off-road (such as mud, rocks, and sand), and the like. The exemplary road surfaces are expressed by a coefficient of friction, and the like. In some embodiments, the coefficient of friction is further expressed or determined from data such as, for example, estimated and sensed torque values, estimated and sensed wheel speeds, and the weight of a vehicle.

Figure 2:
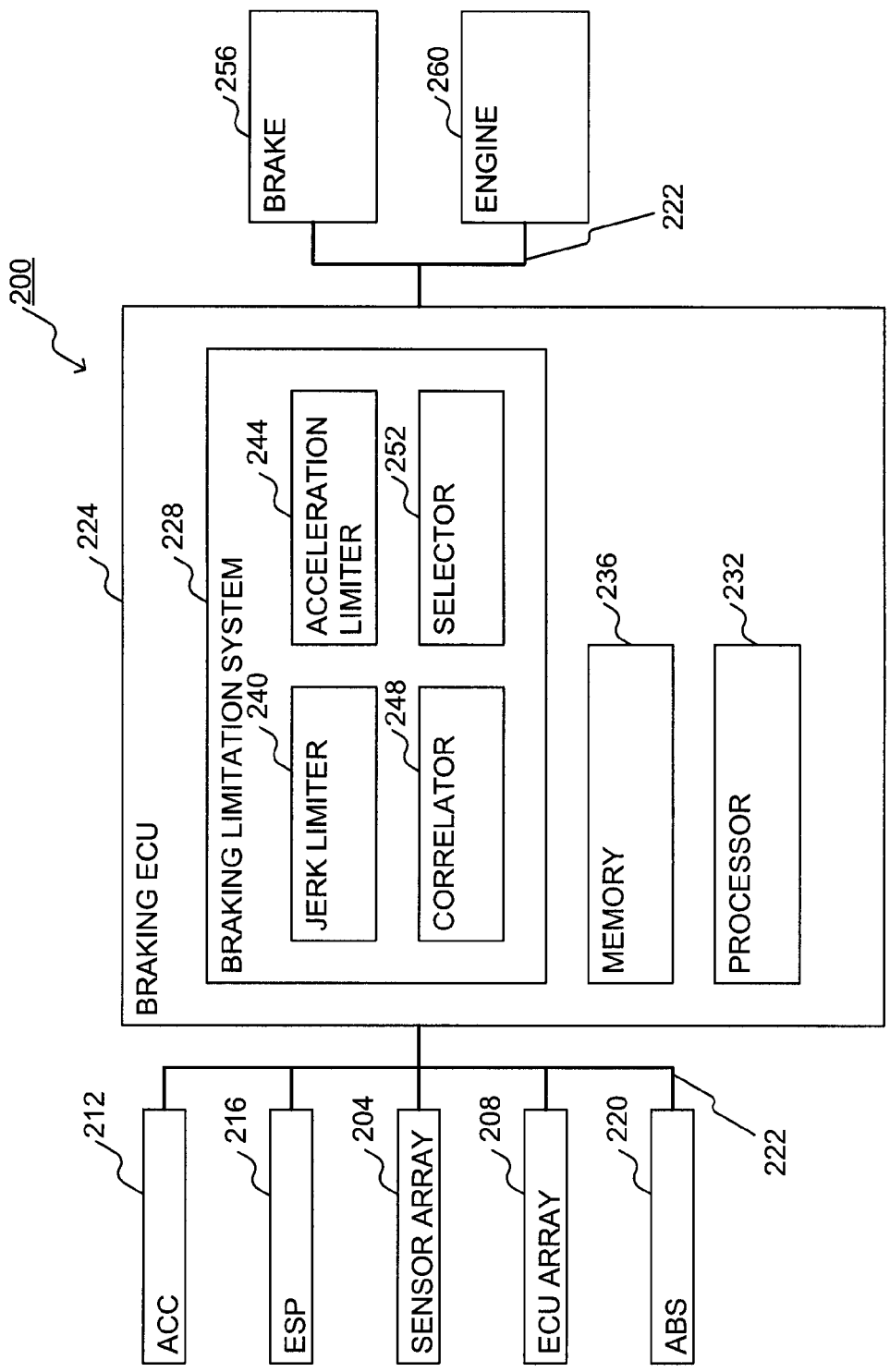
FIG. 2 illustrates a brake control system for use with the vehicle of FIG. 1 and having a correlator.

FIG. 2 shows a brake control system 200 for use with the vehicle 100 of FIG. 1. Although the brake control system 200 is shown in FIG. 2 as an individual system, the brake control system 200 can also be integral with and/or coupled to other systems, such as an adaptive cruise control ("ACC") system, an antilock brake system ("ABS"), a rollover protection system, and the like. The brake control system 200 receives data from a plurality of sensors, collectively referred to herein as a sensor array 204. In one embodiment, the sensor array 204 includes the speed sensors 148, 152, 156, and 160, the steering sensor 168, the yaw rate sensor 172, the lateral acceleration sensor 176, the body slip angle sensor 180, the engine torque sensor 184, the forward-looking radar sensor 188, the temperature sensor 192, the wiper activity sensor 196, and the hitch sensor 198 of FIG. 1.

In some embodiments, the sensor array 204 detects and monitors some specific conditions of the vehicle 100. For example, the sensor array 204, via the speed sensors 148, 152, 156, and 160, senses a condition of the vehicle 100 that is indicative of a movement of the vehicle 100. Sensed conditions are then transduced and converted into calibrated signals that are indicative of the speed of the vehicle 100. If the speed sensors 148, 152, 156, and 160 are equipped with calibration circuitry or microprocessors, the speed can be converted internally to a calibrated form in the speed sensors 148, 152, 156, and 160. Otherwise, the conditions can be converted into calibrated signals by other external processes in a manner known in the art. A plurality of sensors can be used to detect or sense other events such as forward or longitudinal movements, side-to-side or lateral movements, and angles of the movements. Exemplary movements include longitudinal accelerations, longitudinal velocity, and the like. Exemplary sensors that can be used to sense side-to-side or lateral movements include the steering sensor 168, the yaw rate sensor 172, and the lateral acceleration sensor 176. The forward-looking radar sensor 188 can also provide values that are indicative of, for example, distances between the vehicle 100 and its adjacent objects.

Collectively, values of the signals outputted by the sensors 148, 152, 156, 160, 168, 172, 176, 188, 192, 196, and 198 or by the sensor array 204 are referred to as sensed values, or values, hereinafter. The sensed values are provided to the brake control system 200. The brake control system 200 can use the values from the existing sensors to determine an amount of acceleration or braking to be exerted by the vehicle 100 without causing instability or jerk of the vehicle 100.

The brake control system 200 receives other data from other sources such as a plurality of ECU's (e.g., an ECU array 208). In some embodiments, the ECU array 208 includes the ECU 164 of FIG. 1. Other sources include an ACC system 212, an ESP system 216, and an ABS system 220 of the vehicle 100. In some embodiments, the brake control system 200 communicates data internally and externally to other systems or ECU's through a control area network ("CAN") bus 222. Also, in some embodiments, the ECU array 208 provides data such as a total load of the vehicle 100 and any rollover data to the brake control system 200, while the ESP system 216 provides data such as a coefficient of friction (μ) that the vehicle 100 has experienced and a stability history of the vehicle 100 to the brake control system 200 for further processing. The ABS system 220 provides data (such as another stability history of the vehicle 100) to the brake control system 200. Exemplary stability history data includes vehicle data logged during an ABS event, which can be during an experiment and/or during a monitoring of the vehicle 100 in actual usage. Other stability history data includes rollover protection data and/or yaw rate data logged in a rollover event.

In this way, data relevant to processes carried out by the brake control system 200 is dynamically assessed to determine an achievable braking acceleration (also referred to as deceleration) and an achievable value of jerk. An achievable braking acceleration is generally defined as a maximum obtainable value of deceleration of the vehicle 100 without causing instability. An acceleration (or deceleration) value is generally defined as the rate of change of velocity or the second derivative of position with respect to time. Typically, a vehicle 100 with a high rate of deceleration is reducing speed quickly, whereas a vehicle 100 with a low rate of deceleration is reducing speed slowly. An achievable jerk value is generally defined as a maximum obtainable value of jerk of the vehicle 100 without causing instability. A jerk value is generally defined as the rate of change of acceleration or the third derivative of position with respect to time. Typically, a vehicle 100 having a high jerk value indicates the vehicle 100 is vibrating violently, whereas a vehicle 100 having a low jerk value indicates the vehicle 100 is vibrating mildly. Further, a jerk value also indicates a comfort aspect of a vehicle 100. For example, a vehicle 100 having a high jerk value indicates that the vehicle 100 is less comfortable than a vehicle 100 that has a low jerk value.

Either of the deceleration and jerk values if too high can lead to instability of the vehicle 100. The effect can be increased if the vehicle 100 is towing a trailer. For example, the trailer 104, which may not include features like anti-lock braking or even brakes (e.g., a trailer attached to a passenger vehicle), can become unstable and swing before the vehicle 100 becomes unstable. In one construction, determining predictive deceleration and jerk values and determining whether the predictive values are unsatisfactory for the present environment (i.e., greater than obtainable deceleration and jerk values) can be beneficial for limiting the likelihood of the vehicle 100 and/or trailer 104 becoming unstable upon a braking situation. For example, the brake control system 200 generates a signal to cause the vehicle 100 to slow to an acceptable speed if one or more of the predictive deceleration and jerk values is too high.

Further or alternatively, the brake control system 200 limits the amount of braking applied by the system 200 to prevent the vehicle 100 from exceeding the achievable deceleration and jerk values. That is, the environment of the vehicle might change during braking (e.g., the coefficient of friction changes) such that the achievable deceleration and jerk values change. The brake control system 200 changes or limits the amount of applied braking depending on the achievable deceleration and jerk values to result in the vehicle limiting the likelihood of instability.

Although not explicitly shown, other data relevant to the processes carried out by the brake control system 200 can be used. In some embodiments, the brake control system 200 is a portion of the ACC system 212. In such a case, the ACC system 212 internally supplies the brake control system 200, through the CAN bus 222, a combination of a set speed control ("SSC") command value, a follow object control ("FOC") command value, a curve speed control ("CSC") command value, a stationary object control ("SOC") command value, and the like.

The brake control system 200 includes a braking ECU 224. The braking ECU 224 includes a braking limitation system 228 and a processor 232. The processor 232 receives the values from inputs including the sensor array 204, the ECU array 208, the ACC system 212, the ESP system 216, and the ABS system 220. The processor 232 processes the values from the inputs according to a program stored in a memory 236. Although the memory 236 is shown as being external to the processor 232, the memory 236 can also be embedded in the processor 232. Similarly, although the limitation system 228 is shown as being external to the processor 232, the limitation system 228 can also be embedded in the processor 232, or integrated in other control systems of the vehicle 100. In addition, the processor 232 can be a general-purpose microcontroller, a general-purpose microprocessor, a dedicated microprocessor or controller, a signal processor, an application-specific-integrated circuit ("ASIC"), or the like. In some embodiments, the braking limitation system 228 and its functions described are implemented in a combination of firmware, software, hardware, and the like. To be more specific, as illustrated in FIG. 2, the processor 232 communicates with the braking limitation system 228 assuming that these components are implemented in hardware. However, the functionality of these components can be implemented in software, and the software can, for example, be stored in the memory 236 and executed by the processor 232.

The braking limitation system 228 includes a jerk limiter 240, an acceleration limiter 244, a correlator 248, and a selector 252. The correlator 248 receives values from the inputs, and determines one or more correlations or correlation coefficients between some or all of the values. Based on the correlations, the jerk limiter 240 and the acceleration limiter 244 determine a plurality of braking control parameters, including jerk values and acceleration values. For example, in a first linear correlation model, the correlator 248 correlates the coefficient of friction to an achievable amount of acceleration that the vehicle 100 can exert. The correlator 248 correlates the total load to a second achievable amount of acceleration that the vehicle 100 can exert due to the total load. In a second linear correlation model, the correlator 248 correlates the coefficient of friction and the total load values. In some embodiments, the correlator 248 generates one or more criticality indices. Based on the criticality indices and/or the correlation, the jerk limiter 240 and the acceleration limiter 244 generate a jerk value and an acceleration value, respectively.

In the embodiment shown, the jerk value is generally a maximum obtainable jerk value for the determined correlation between the coefficient of friction and the total load. Similarly, the acceleration value is a maximum obtainable acceleration value for the correlation between the coefficient of friction and the total load. For example, for the same coefficient of friction value, the acceleration limiter 244 generates a higher limitation for the achievable acceleration value, which corresponds to less available deceleration when the total load is relatively greater. Conversely, the acceleration limiter 244 generates a lower limitation for the achievable acceleration value, which corresponds to greater available deceleration when the total load is relatively lower. In the embodiment shown, the correlator 248 generates the correlations in parallel. However, the correlator 248 can also generate the correlations in another order. Further, while the above examples use a linear correlation, the correlation module 248 can also use other types of correlations such as, logarithmic, parabolic, and the like. It is envisioned that in some environments having less than ideal road conditions, e.g., a low coefficient of friction due to snow, an example amount of achievable deceleration is 2.5 m/s$^2$ (i.e., an acceleration of −2.5 m/s$^2$). However, when the road conditions are close to ideal, an example amount of achievable deceleration is 6 m/s$^2$ (i.e., an acceleration of −6 m/s$^2$) Numerous other values may be calculated depending on the environment of the vehicle 100. Also, different correlation models may generate different deceleration values depending on the inputs and/or the model used.

Similarly, it is envisioned that in some environments having less than ideal conditions an example amount of achievable jerk is $-1.0$ m/s$^3$ However, when the conditions are close to ideal an example amount of achievable deceleration is $-5.0$ m/s$^3$. Numerous other values may be calculated depending on the environment of the vehicle 100 and the history acquired for the driver. Also, different correlation models may generate different jerk values depending on the inputs and/or the model used.

The selector 252 determines an obtainable brake control parameter from one or more of the generated brake control parameters. For example, the selector 252 selects a minimum jerk value and a minimum acceleration value from the determined jerk and acceleration values. The braking ECU 224 then transmits signals indicative of the selected values through the CAN bus 222 to a brake system 256 and an engine control system 260 such that appropriate and maximally achievable deceleration or braking, without causing instability or jerk of the vehicle 100, can be applied.

Figure 3:
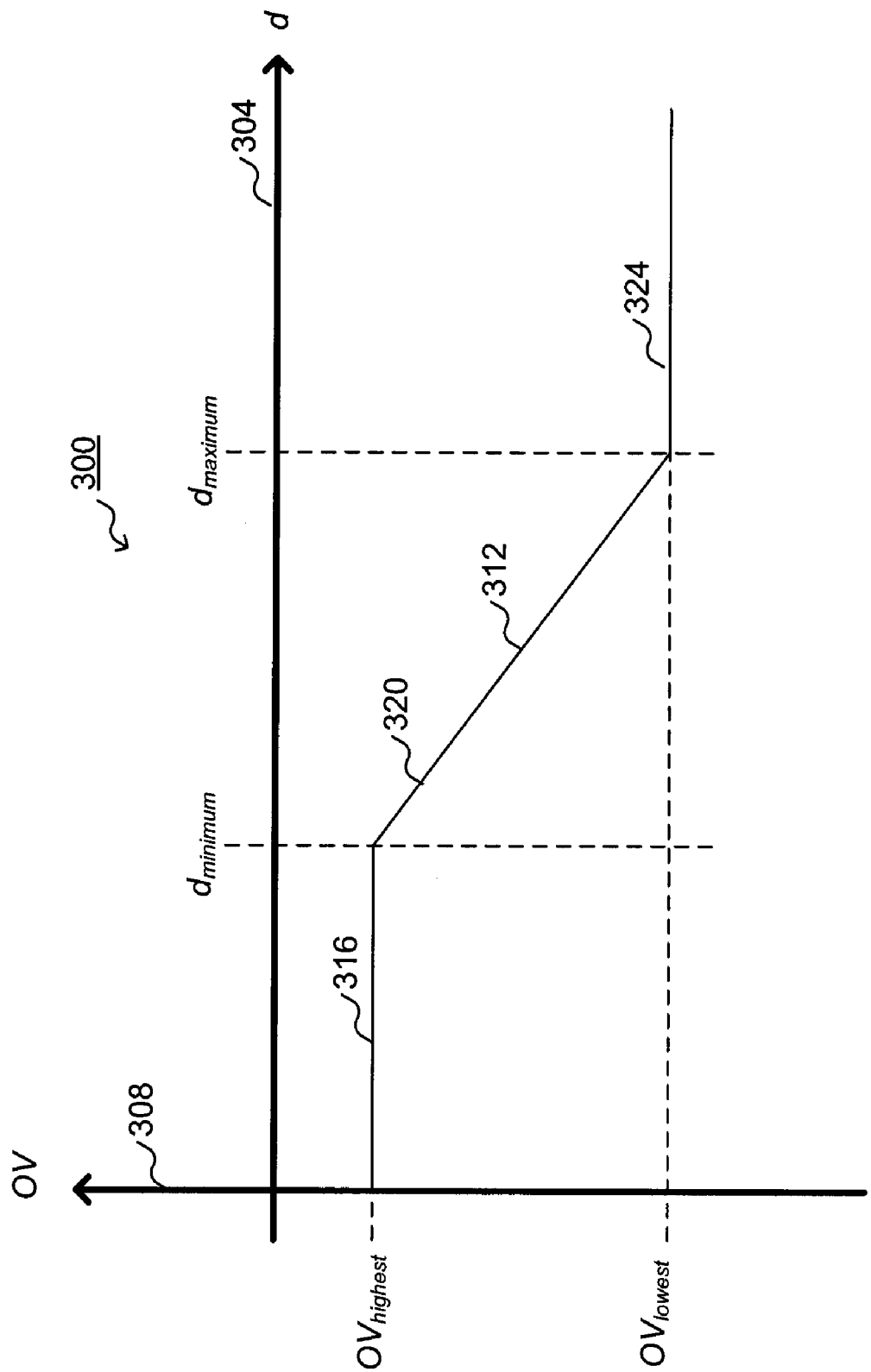
FIG. 3 illustrates an exemplary correlation function 300 for use with the correlator of FIG. 2.

FIG. 3 shows an exemplary correlation function 300 for use with the correlator 248 of FIG. 2. The determined values (d) are measured along the x-axis 304. The determined values (d) generally include values such as the coefficient of friction, longitudinal velocity and acceleration, lateral velocity and acceleration, and the total load, from sources such as the ACC system 212, the ESP 216, the sensor array 204, the ECU array 208, and the ABS 220. A plurality of obtainable values (OV) (for example, the achievable acceleration and jerk values) are measured along the y-axis 308. A linear correlation function or curve 312 relates the determined values (d) to the obtainable values (OV).

The correlation curve 312 includes three linear sections. When the determined values are below a minimum determined value ($d_{minimum}$), the correlation curve 312 relates the determined values to a maximum obtainable value ($OV_{highest}$), which corresponds to a first correlation section 316. When the determined values are between a maximum determined value ($d_{maximum}$) and the minimum determined values ($d_{minimum}$) the correlation curve 312 linearly relates the determined values to the obtainable value (OV), which corresponds to a second correlation section 320. When the determined values are above the maximum determined values ($d_{maximum}$), the correlation curve 312 relates the determined values to a minimum obtainable value ($OV_{lowest}$), which corresponds to a third correlation section 324. As discussed earlier, other types of correlation functions or curves, such as, parabolic, logarithmic, and the like, can also be used.

Figure 4:
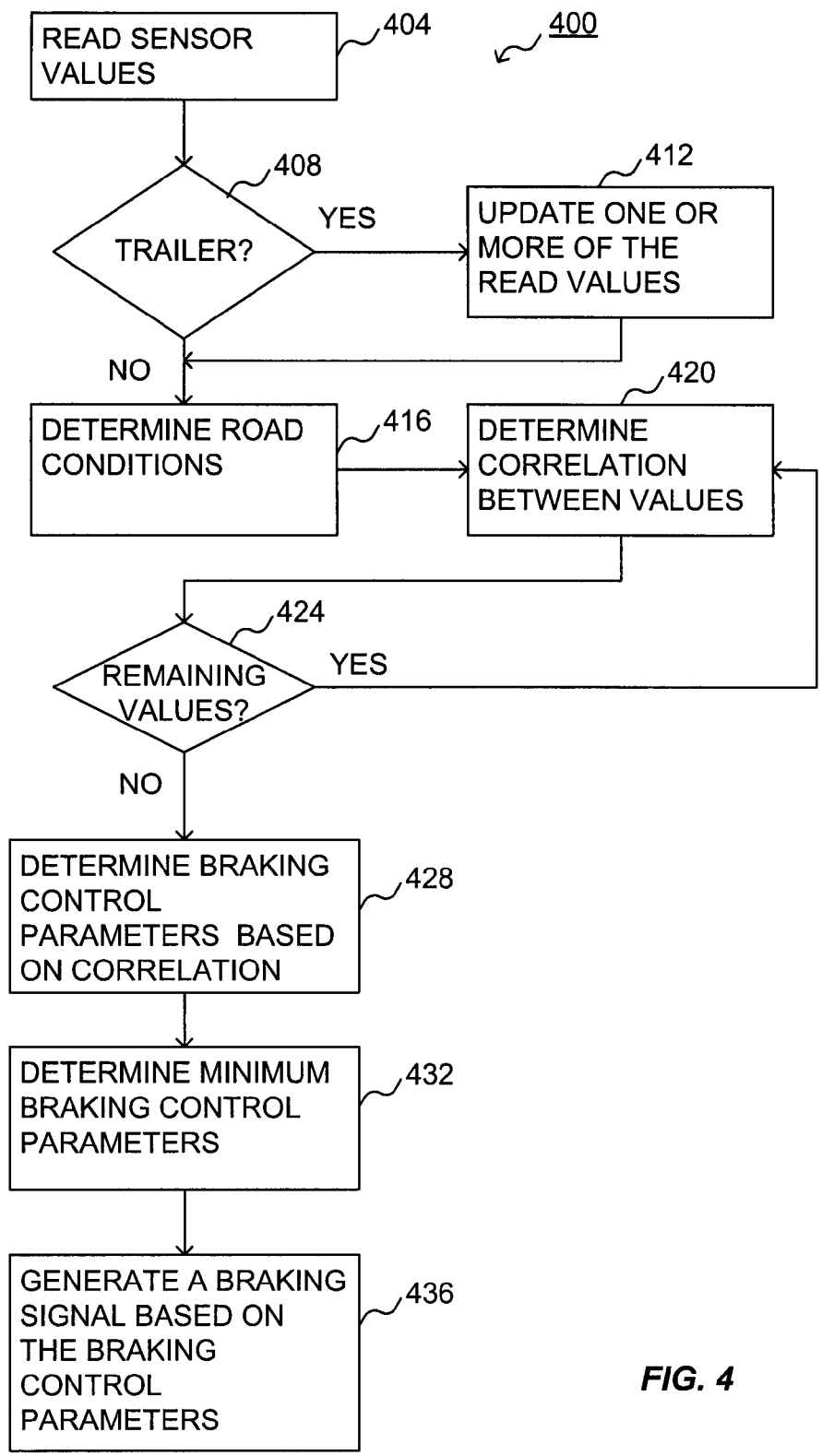
FIG. 4 shows a flow chart of a braking control process according to an embodiment of the invention.

FIG. 4 illustrates an exemplary braking control process 400 that determines an achievable amount of acceleration (deceleration) that the vehicle 100 of FIG. 1 with an allowable amount of vibration (jerk). It should be noted that when the braking control process 400 is described as performing an action, such as determining, correlating, comparing, updating, and the like, it should be understood that such a description is used as a short-hand way of describing the invention and that, in one embodiment, the braking control process 400 is carried out by the processor 232 of FIG. 2, and the results of carrying out all or part of the braking control process 400 include the described determining, correlating, comparing, updating, and other actions.

At block 404, the braking control process 400 reads in a plurality of sensed and other values. At block 408, the braking control process 400 determines if the vehicle 100 is towing a load such as the trailer 104. If the braking control process 400 determines the vehicle 100 is towing a load at block 408, the braking control process 400 updates one or more of the read values at block 412. In some embodiments, the braking control process 400 updates the total of the vehicle 100, which increases from the weight of the vehicle 100 to the weight of the vehicle 100 and the weight of the load. In some embodiments, the weight of the load can be determined by the hitch sensor 198, as previously described.

At block 416, the braking control process 400 determines or estimates a road condition from either the updated values or the read values. If the braking control process 400 determines the vehicle 100 is not towing any load at block 408, the braking control process 400 proceeds to block 416. For example, the ESP system 216 of FIG. 2 determines a coefficient of friction, which is an exemplary road condition that the vehicle 100 is experiencing.

At blocks 420 and 424, the braking control process 400 then determines or correlates one or more of the updated and/or the read values until a predetermined number of the values have been evaluated. In some embodiments, the braking control process 400 correlates all of the updated and the read values at blocks 420 and 424. At block 428, the braking control process 400 proceeds to determine a plurality of braking control parameters such as a maximum achievable acceleration based on each of the correlated values, and a maximum allowable jerk also based on one or more of the correlated values.

At block 432, the braking control process 400 determines a minimum of the braking control parameters from the determined plurality of braking control parameters. In the example given above, the braking control process 400 selects at block 432 a minimum acceleration and a minimum jerk determined at block 428. At block 436, the braking control process 400 generates a braking signal based on the braking control parameters, which allows the brake system 256 to activate one or more of associated brakes, and the engine 260 to slow down.

Therefore, the invention provides a new and useful system for and method of controlling a vehicle. Various features and advantages of the invention are set forth in the following claims.

What is claimed is:

1. A method of controlling a vehicle configured to tow a trailer, the method comprising:
    determining a first parameter indicative of conditions of the vehicle;
    determining a trailer presence based on the first parameter;
    updating the first parameter when the trailer is present;
    determining a second parameter indicative of conditions of a road where the vehicle is traveling;
    determining a maximum obtainable acceleration value of the vehicle without causing instability of the vehicle based on at least one of the first parameter and the second parameter;
    determining a maximum obtainable jerk value of the vehicle without causing instability of the vehicle based on at least one of the first parameter and the second parameter; and
    generating a braking signal for the vehicle based on the maximum obtainable acceleration value and the maximum obtainable jerk value.

2. The method of claim 1, wherein generating a braking signal comprises determining a minimum braking control parameter based on the maximum obtainable acceleration value and the maximum obtainable jerk value.

3. The method of claim 1, wherein determining a trailer presence includes obtaining a reading from a hitch sensor.

4. The method of claim 1, wherein determining the second parameter includes determining a coefficient of friction of a surface of the road.

5. The method of claim 1, wherein determining the maximum obtainable acceleration value and the maximum obtainable jerk value comprises determining first and second correlations, each of the first and second correlations being based on at least one of the first parameter and the second parameter.

6. The method of claim 5, further comprising determining the first and second correlations in parallel.

7. The method of claim 1, wherein determining at least one of the first parameter and the second parameter comprises determining at least one of longitudinal acceleration, lateral acceleration, total load, a coefficient of friction, yaw rate, temperature, and wiper activity.

8. A method of controlling a vehicle operable to tow a trailer, the method comprising:
determining a first parameter indicative of conditions of the vehicle;
determining a second parameter indicative of conditions of a road where the vehicle is traveling;
determining first and second correlations, each of the first and second correlations based on at least one of the first and second parameters;
determining a plurality of maximum obtainable acceleration values of the vehicle without causing instability of the vehicle and a plurality of maximum obtainable jerk values of the vehicle without causing instability of the vehicle based on the first and second correlations; and
determining from one of the plurality of maximum obtainable acceleration values and one of the plurality of maximum obtainable jerk values an achievable braking control parameter for the vehicle.

9. The method of claim 8, further comprising:
determining a trailer presence from at least one of the first and second parameters; and
updating the first parameter if the trailer is present.

10. The method of claim 8, wherein determining an achievable braking control parameter comprises determining a minimum of the plurality of maximum obtainable acceleration values and a minimum of the plurality of maximum obtainable jerk values.

11. The method of claim 8, wherein determining the second parameter includes determining a coefficient of friction of a surface of the road.

12. The method of claim 8, further comprising determining the first and second correlations in parallel.

13. The method of claim 8, wherein determining at least one of the first and second parameters comprises determining at least one of longitudinal acceleration, lateral acceleration, total load, a coefficient of friction, yaw rate, temperature, and wiper activity.

14. A system for controlling a vehicle operable to tow a trailer, the system comprising:
a first sensor configured to sense first parameters indicative of one or more conditions of the vehicle;
a second sensor configured to sense second parameters indicative of conditions of a road where the vehicle is traveling;
a correlator configured to determine a plurality of correlations, each of the plurality of correlations based on at least one of the first and second parameters;
an acceleration limiter configured to determine a plurality of acceleration values based on the first and second parameters and the plurality of correlations;
a jerk limiter configured to determine a plurality of jerk values based on the first and second vehicle parameters and the plurality of correlations; and
a selector configured to determine a braking control parameter for the vehicle based on one of the plurality of acceleration values and one of the plurality of jerk values.

15. The system of claim 14, further comprising a processor configured to determine a trailer presence from at least one of the first and second parameters, and to update the first parameters if the trailer is present.

16. The system of claim 14, wherein the selector is configured to determine the braking control parameter based on a minimum of the plurality of acceleration values.

17. The system of claim 14, wherein the selector is configured to determine the braking control parameter based on a minimum of the plurality of jerk values.

18. The system of claim 14, wherein the correlator is further configured to determine the first and second correlations in parallel.

19. The system of claim 14, wherein at least one of the first and second parameters comprises at least one of longitudinal acceleration, lateral acceleration, total load, a coefficient of friction, yaw rate, temperature, and wiper activity.

20. A vehicle comprising:
a first sensor configured to sense first parameters indicative of one or more conditions of the vehicle;
a second sensor configured to sense second parameters indicative of one or more conditions of a road where the vehicle is traveling;
a hitch configured to receive a trailer;
a processor configured to determine if a trailer is present on the hitch, and to update the first parameters when a trailer is present;
a correlator configured to determine a plurality of correlations, wherein each of the plurality of correlations is based on at least one of the first and second parameters;
an acceleration limiter configured to determine a plurality of acceleration values based on the first and second parameters and the plurality of correlations;
a jerk limiter configured to determine a plurality of jerk values based on the first and second parameters and the plurality of correlations;
a selector configured to determine a braking control parameter for the vehicle based on one of the plurality of acceleration values and one of the plurality of jerk values; and
a brake system configured to be activated to decelerate the vehicle based on the braking control parameter.

21. The vehicle of claim 20, wherein the selector determines the braking control parameter based on a minimum of the plurality of acceleration values.

22. The vehicle of claim 20, wherein the selector determines the braking control parameter based on a minimum of the plurality of jerk values.

23. The vehicle of claim 20, wherein the correlator is further configured to determine the first and second correlations in parallel.

24. The vehicle of claim 20, wherein at least one of the first and second parameters comprises at least one of longitudinal acceleration, lateral acceleration, total load, a coefficient of friction, yaw rate, temperature, and wiper activity.

* * * * *